United States Patent
Bergström et al.

(10) Patent No.: US 10,666,346 B2
(45) Date of Patent: May 26, 2020

(54) NETWORK NODE, WIRELESS DEVICE, AND METHODS FOR BEAM MANAGEMENT

(71) Applicant: Telefonaktiebolaget LM Ericsson (publ), Stockholm (SE)

(72) Inventors: Andreas Bergström, Linköping (SE); Håkan Andersson, Linköping (SE); Johan Furuskog, Stockholm (SE); Tomas Sundin, Sollentuna (SE); Niclas Wiberg, Linköping (SE); Qiang Zhang, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 30 days.

(21) Appl. No.: 15/774,309

(22) PCT Filed: Nov. 11, 2016

(86) PCT No.: PCT/SE2016/051117
§ 371 (c)(1),
(2) Date: May 8, 2018

(87) PCT Pub. No.: WO2017/082810
PCT Pub. Date: May 18, 2017

(65) Prior Publication Data
US 2019/0312628 A1    Oct. 10, 2019

Related U.S. Application Data

(60) Provisional application No. 62/254,068, filed on Nov. 11, 2015.

(51) Int. Cl.
*H04B 7/08* (2006.01)
*H04B 7/0404* (2017.01)
*H04B 7/06* (2006.01)

(52) U.S. Cl.
CPC ............ *H04B 7/086* (2013.01); *H04B 7/0404* (2013.01); *H04B 7/0617* (2013.01)

(58) Field of Classification Search
CPC .... H04B 7/086; H04B 7/0404; H04B 7/0617; H04B 7/0417; H04B 7/0669; H04L 1/0618; H04L 1/06; H04L 25/0204
See application file for complete search history.

(56) References Cited

U.S. PATENT DOCUMENTS

| 2005/0221838 A1 | 10/2005 | Cha et al. |
| 2011/0110453 A1 | 5/2011 | Prasad et al. |

(Continued)

FOREIGN PATENT DOCUMENTS

WO    2015109153 A1    7/2015

*Primary Examiner* — Ted M Wang
(74) *Attorney, Agent, or Firm* — Coats & Bennett, PLLC

(57) ABSTRACT

Embodiments herein relate to a method performed by a wireless device (10) for managing beam-formed communication in a wireless communication network (1), wherein the wireless device (10) is configured to handle separate directional device beams at the wireless device (10). The wireless device (10) forms an active set for a first device beam out of the separate directional device beams of the wireless device by selecting one or more first network beams out of a plurality of separate directional network beams of the wireless communication network (1). The one or more first network beams are selected based on received signal strength or quality, and the active set is to be used for transmission or reception of data. The wireless device selects a first network beam in the active set as a preferred network beam for transmission or reception of data. The wireless device further forms a monitored set for a second device beam out of the one or more separate directional device beams of the wireless device by selecting one or more second network beams out of the plurality of separate directional network beams of the wireless communication (Continued)

network (1). The one or more second network beams are selected based on received signal strength or quality, but are not to be currently used for the transmission or reception of data. The wireless device transmits to a network node (12) a first indication of the preferred network beam and the received signal strengths or qualities for the one or more first network beams in the formed active set for the first device beam of the wireless device, and a second indication indicating the one or more second network beams of the formed monitored set and the received signal strengths or qualities for the one or more second network beams in the formed monitored set for the second device beam of the wireless device.

22 Claims, 13 Drawing Sheets

(56) References Cited

U.S. PATENT DOCUMENTS

| | | |
|---|---|---|
| 2013/0039345 A1 | 2/2013 | Kim et al. |
| 2013/0301454 A1* | 11/2013 | Seol ................. H04B 7/043 |
| | | 370/252 |
| 2015/0341095 A1* | 11/2015 | Yu ................. H04B 7/0619 |
| | | 370/252 |

* cited by examiner

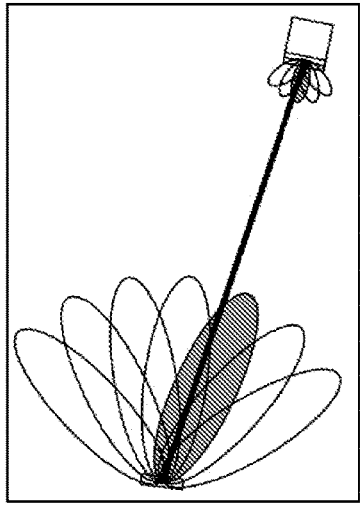
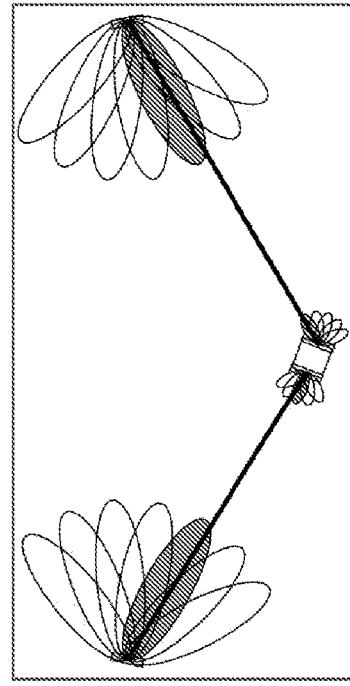
Single panel example
Active Set = U3,N3
Dual-panel panel example
Active Set = (U3,U10),(N3,N5)
Fig. 3a
Fig. 3b Active Set = U3,N3
Monitored Set = U1,N6

| BRS-RP | N1 | N2 | N3 | N4 | N5 | N6 | N7 |
|---|---|---|---|---|---|---|---|
| U1 | | | | | | -72 | |
| U2 | | -79 | -76 | | | | |
| U3 | | | -70 | -74 | | | |
| U4 | | | -83 | | | | |
| U5 | | | | | | | |

NW beams / UE beams

Fig. 3c

NETWORK NODE, WIRELESS DEVICE, AND METHODS FOR BEAM MANAGEMENT

TECHNICAL FIELD

Embodiments herein generally relate to wireless communication networks, and in particular to a network node, a wireless device, and methods of beam-formed communication management.

BACKGROUND

The Background section of this document is provided to place embodiments herein in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

Many implementations of Fifth Generation (5G) base stations are expected to utilize so-called analog beamforming. This is due to the higher complexity, mostly from a hardware perspective, of implementing so-called digital beamforming. The latter imposes fewer functionality restrictions but is rather more costly to realize.

As used herein, "beamforming" means that a transmitter can amplify transmitted signals in selected directions, while weakening them in others. Correspondingly, a receiver can amplify signals received from selected directions while weakening unwanted signals in other directions. Analog beamforming in this context means that this can only be applied to one direction or a limited set of directions at a time by each transmitter/receiver. An array of multiple transmit antennas or receive antennas must be used to transmit or receive in multiple directions at the same time. To beamform, a signal is transmitted from multiple transmit antennas, but with individually adjusted phase shifts or time delays, which effectively creates a beam in the resulting transmit radiation pattern of the signal—e.g., through controlled constructive and destructive interference of the phase-shifted signals from individual antenna elements. The beam direction depends on the phase shifts of the antenna elements. Similarly, in the case of a receiver, phase shifts between antenna elements can be used to steer the maximal antenna sensitivity toward a desired direction.

Beamforming allows the received signal to be stronger for an individual connection, thereby enhancing throughput and coverage for that connection. It also enables a reduction in the interference from unwanted signals, thereby enabling several simultaneous transmissions over multiple individual connections using the same time-frequency resource, so called spatial multiplexing or Multiple Input Multiple Output (MIMO) using either a single user (SU)-MIMO, or multiple users (MU)-MIMO.

An important problem with beamforming is to decide which beam(s), i.e., which direction(s), to use for transmission and/or reception. To support base station beamforming, i.e., beamforming at a network node such as a base station, a number of reference signals may be transmitted in different beam directions, respectively, from the network node or base station. Each wireless device or User Equipment (UE) can measure these reference signals and report the measurement results to the network node. The network node may then use these measurement results to decide which beam(s) to use for data transmission to one or more wireless devices. As further described herein, a network node can use a combination of persistent and dynamic reference signals for this purpose.

The persistent reference signals, denoted herein as beam reference signals (BRS), are transmitted repeatedly in a large number of different beam directions. This allows a wireless device to measure the BRS when transmitted in different beams, without any special arrangement or instruction for that wireless device from perspective of the network node. The wireless device reports the received powers for different BRS back to the network node, along with an index of the BRS, given for example by the BRS sequence and the time and frequency position of the particular BRS. By reporting a BRS index and an associated received power of that BRS, the wireless device is effectively reporting its preferred beam. The wireless device may report a list of BRS indices and associated received powers, for example, its top eight strongest BRSs.

The network node may then transmit dedicated reference signals to a particular wireless device, using one or more beams or beam directions that were reported as strong for that wireless device. These are dedicated reference signals and may thus only be present when the wireless device has data to receive, and they give more detailed feedback information of the beam-formed channel, such as co-phasing information of the polarizations and the recommended transport block size, as well as the transmission rank in case of spatial multiplexing. Since the BRS is transmitted repeatedly over a large number of beams, the repetition period should be relatively long, to avoid using too much resource overhead for the BRS transmissions.

The dynamic reference signals, denoted herein as channel-state information reference signals (CSI-RS), are transmitted only when needed for a particular connection. The decisions of when and how to transmit the CSI-RS are made by the network node and signaled to the involved wireless devices using a measurement grant or configuration message. When the wireless device receives a measurement grant it measures on a corresponding CSI-RS. The network node can choose to transmit CSI-RS to a wireless device using only beam(s) that are known to be strong for that wireless device, to allow the wireless device to report more detailed information about those beams. Alternatively, the network node can choose to transmit CSI-RS also using beam(s) that are not known to be strong for that wireless device, for instance to enable fast detection of new beam(s) in case the wireless device is moving.

The 5G network nodes transmit other reference signals as well. For example, the network nodes may transmit a demodulation reference signal (DMRS) when transmitting control information or data to a wireless device. Such transmissions are typically made using beam(s) that are known to be strong for that wireless device.

In Fourth Generation (4G) systems, discovery reference signals (DRS) may be used for the same purpose as BRS, as described above. Hence, the LTE wireless device is configured to perform received power measurements on a set of different DRS signals and report the associated DRS index and measured received power for the eight DRS measurements with highest power. Accordingly, although described in the context of 5G, the principles and concepts discussed herein are applicable to 4G systems as well.

Beamforming is not restricted to network nodes. It can also be implemented in the receiver of the wireless device, further enhancing the received signal and suppressing interfering signals. The wireless device may also implement transmit beamforming. Similar to a network node, analog beamforming can be used in the wireless device, which means that the wireless device can only receive/transmit from/to one direction at a time, unless multiple receivers/transmitters are available.

When operating with the 5G base stations or network nodes, a wireless device with analog receive beamforming can measure the BRS using different device beams of the wireless device, and then choose the device beam(s) that provides the highest Beam Reference Symbol Received Power (BRSRP). However, care must be taken when comparing the Reference Signal Received Power (RSRP) of different device beams since the received power depends on the utilized combination of network and device beams. A given device beam may have a high BRSRP when paired with a certain network beam, but have a low BRSRP in combination with other network beams. A different device beam may also give an equally high BRSRP when combined with a different network beam, but give a low BRSRP in combination with all other network beams.

Since the network node may not transmit all BRS at the same time, e.g., due to limitations imposed by analog beamforming, but rather cycle through all network beams during some time window, it is important that BRSRP-values for different device beams that are compared stem from measuring the same network beam, otherwise the measurements may not be comparable.

Known implementations of beamforming in wireless communication networks do not provide mechanisms for robust management of network and device beams. Relying on the known solutions, device beam selection can only be done slowly, such that it can be treated as changes in the radio channel in order to keep it transparent to the network operation. This may result in that the beams are used in a non-optimal manner reducing or limiting the performance of the wireless communication network.

SUMMARY

The following presents a simplified summary of the disclosure in order to provide a basic understanding to those of skill in the art. This summary is not an extensive overview of the disclosure and is not intended to identify key/critical elements of embodiments herein. The sole purpose of this summary is to present some concepts disclosed herein in a simplified form as a prelude to the more detailed description that is presented later.

An object of embodiments herein is to improve the performance of the wireless communication network when using beam-formed communication.

According to an aspect of embodiments herein the object is achieved by providing a method performed by a wireless device for managing beam-formed communication in a wireless communication network, wherein the wireless device is configured to handle separate directional device beams at the wireless device. The wireless device forms an active set for a first device beam out of the separate directional device beams of the wireless device by selecting one or more first network beams out of a plurality of separate directional network beams of the wireless communication network. The one or more first network beams are selected based on received signal strength or quality, and the active set is to be used for transmission or reception of data. The wireless device selects a first network beam in the active set as a preferred network beam for transmission or reception of data. The wireless device forms a monitored set for a second device beam out of the one or more separate directional device beams of the wireless device by selecting one or more second network beams out of the plurality of separate directional network beams of the wireless communication network, which one or more second network beams are selected based on received signal strength or quality, but which are not to be currently used for the transmission or reception of data. Furthermore, the wireless device transmits to a network node a first indication of the preferred network beam and the received signal strengths or qualities for the one or more first network beams in the formed active set for the first device beam of the wireless device, and a second indication indicating the one or more second network beams of the formed monitored set and the received signal strengths or qualities for the one or more second network beams in the formed monitored set for the second device beam of the wireless device.

According to another aspect of embodiments herein the object is achieved by providing a method performed by a network node for managing beam-formed communication with a wireless device in a wireless communication network. The network node transmits, to the wireless device, a respective reference signal in separate directional network beams. The network node further receives, from the wireless device, a first indication of a preferred network beam out of a plurality of separate directional network beams of the wireless communication network including the separate directional network beams of the network node, and signal strengths or qualities for one or more first network beams in a formed active set for a first device beam of the wireless device. The network node further receives a second indication indicating one or more second network beams of a formed monitored set for a second device beam of the wireless device and the signal strengths or qualities for the one or more second network beams in the formed monitored set for the second device beam of the wireless device.

According to yet another aspect of embodiments herein the object is achieved by providing a wireless device for managing beam-formed communication in a wireless communication network. The wireless device is configured to handle separate directional device beams at the wireless device. Furthermore, the wireless device is configured to form an active set for a first device beam out of the separate directional device beams of the wireless device by being configured to select one or more first network beams out of a plurality of separate directional network beams of the wireless communication network. The one or more first network beams are selected based on received signal strength or quality, and the active set is to be used for transmission or reception of data. The wireless device is further configured to select a first network beam in the active set as a preferred network beam for transmission or reception of data. In addition, the wireless device is configured to form a monitored set for a second device beam out of the one or more separate directional device beams of the wireless device by being configured to select one or more second network beams out of the plurality of separate directional network beams of the wireless communication network. The one or more second network beams are selected based on received signal strength or quality, but are not to be currently used for the transmission or reception of data. The wireless device is furthermore configured to transmit to a network node a first indication of the preferred network beam and the received signal strengths or qualities for the one or more first network beams in the formed active set for the first device beam of the wireless device, and a second indication indicating the one or more second network beams of the formed monitored set and the received signal strengths or qualities for the one or more second network beams in the formed monitored set for the second device beam of the wireless device.

According to still another aspect of embodiments herein the object is achieved by providing a network node for managing beam-formed communication with a wireless device in a wireless communication network. The network node is configured to transmit to the wireless device, a respective reference signal in separate directional network beams. The network node is furthermore configured to receive from the wireless device, a first indication of a preferred network beam out of a plurality of separate directional network beams of the wireless communication network including the separate directional network beams of the network node, and signal strengths or qualities for one or more first network beams in a formed active set for a first device beam of the wireless device. The network node is further configured to receive a second indication indicating one or more second network beams of a formed monitored set for a second device beam of the wireless device and the signal strengths or qualities for the one or more second network beams in the formed monitored set for the second device beam of the wireless device.

Mechanisms and procedures for beam management are herein provided, such that the selection of the device beam and network beam results in a reliable connection for signaling, e.g. control signaling, and data transmission/reception, while also allowing for unrestricted and rapid mobility in a robust fashion.

BRIEF DESCRIPTION OF THE DRAWINGS

The embodiments herein will now be described more fully hereinafter with reference to the accompanying drawings, in which some embodiments are shown. However, possible embodiments should not be construed as limited to the embodiments set forth herein. Rather, these embodiments are provided so that this disclosure will be thorough and complete. Like numbers refer to like elements throughout.

FIG. 3a depicts an active set for a single wireless device panel.

FIG. 3b depicts an active set for a dual wireless device panel.

FIG. 3c depicts a monitored set.

DETAILED DESCRIPTION

For simplicity and illustrative purposes, embodiments herein are described by referring mainly to an exemplary embodiment thereof. In the following description, numerous specific details are set forth in order to provide a thorough understanding of embodiments herein. However, it will be readily apparent to one of ordinary skill in the art that embodiments herein may be practiced without limitation to these specific details. In this description, well known methods and structures have not been described in detail so as not to unnecessarily obscure disclosed embodiments.

Figure 1:
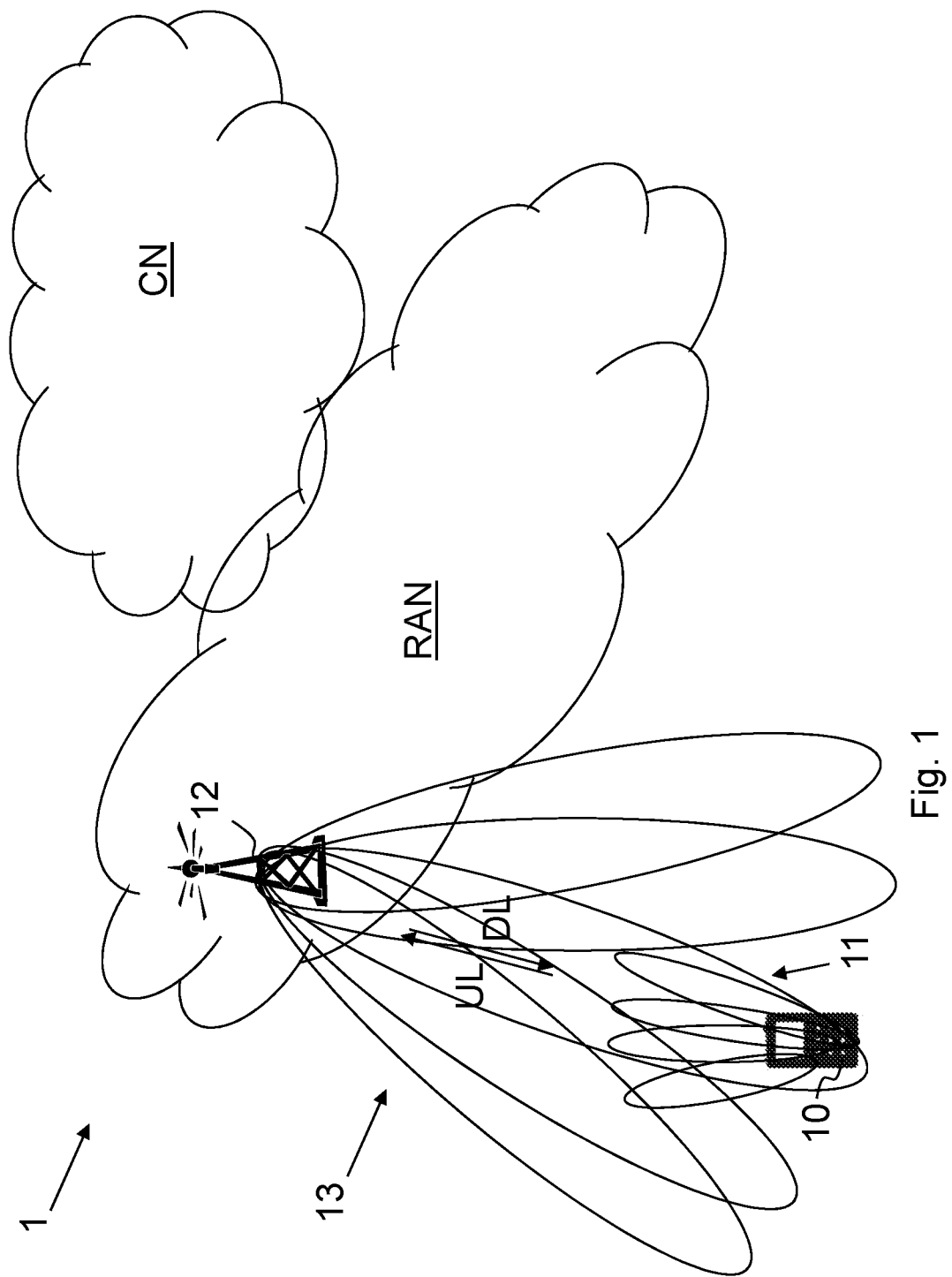
FIG. 1 shows a schematic overview depicting a communication network according to embodiments herein.

Embodiments herein relate to wireless communication networks in general. FIG. 1 is a schematic overview depicting a wireless communication network 1. The wireless communication network 1 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), 5G system such as an NR system, or any cellular network or system. Thus, although terminology from 3GPP LTE may be used in this disclosure to exemplify embodiments herein, this should not be seen as limiting the scope of the embodiments herein to only the aforementioned system.

In the wireless communication network 1, a wireless device 10, also known as a mobile station, a user equipment and/or a wireless terminal, communicates via a Radio Access Network (RAN) to one or more core networks (CN). It should be understood by the skilled in the art that "wireless device" is a non-limiting term which means any wireless terminal, user equipment, Machine Type Communication (MTC) device, a Device to Device (D2D) terminal, or node e.g. Personal Digital Assistant (PDA), laptop, mobile phone, sensor, relay, mobile tablets or even a small base station communicating within respective cell. The wireless device 10 may measure BRS of network beams using one or more device beams 11, also referred to as receiving beams, UE beams, UE receive beams, separate directional device beams or similar.

The wireless communication network 1 covers a geographical area which is divided into service areas being served by a network node 12. The network node 12 may provide one or more network beams 13, also referred to as transmitting beams, network transmit beams, separate directional network beams or similar. The network node 12 may also be referred to as a radio network node or a radio base station and e.g. a NodeB, an evolved Node B (eNB, eNode B), a base transceiver station, Access Point Base Station, base station router, or any other network unit capable of communicating with a wireless device within the cell served by the network node depending e.g. on the radio access technology and terminology used. The network node 12 may serve, transmit or control one or more beams.

The wireless device 10 transmits data over the radio interface to the network node 12 in Uplink (UL) transmissions and the network node 12 transmits data over an air or radio interface to the wireless device 10 in Downlink (DL) transmissions.

According to embodiments herein the wireless device 10 forms an active set of first network beams of the wireless communication network 1 and a first device beam of the wireless device 10. The wireless device 10 further forms a monitored set, also referred to as a candidate set, of second network beams of the wireless communication network 1 and a second device beam of the wireless device 10. These sets are then reported back to the network node 12 and this enables an efficient switch between different network/device beams providing a reliable connection for signaling and data transmission/reception, while also allowing for unrestricted and rapid mobility in a robust fashion and also leading to an improved performance of the wireless communication network 1.

Figure 2A:
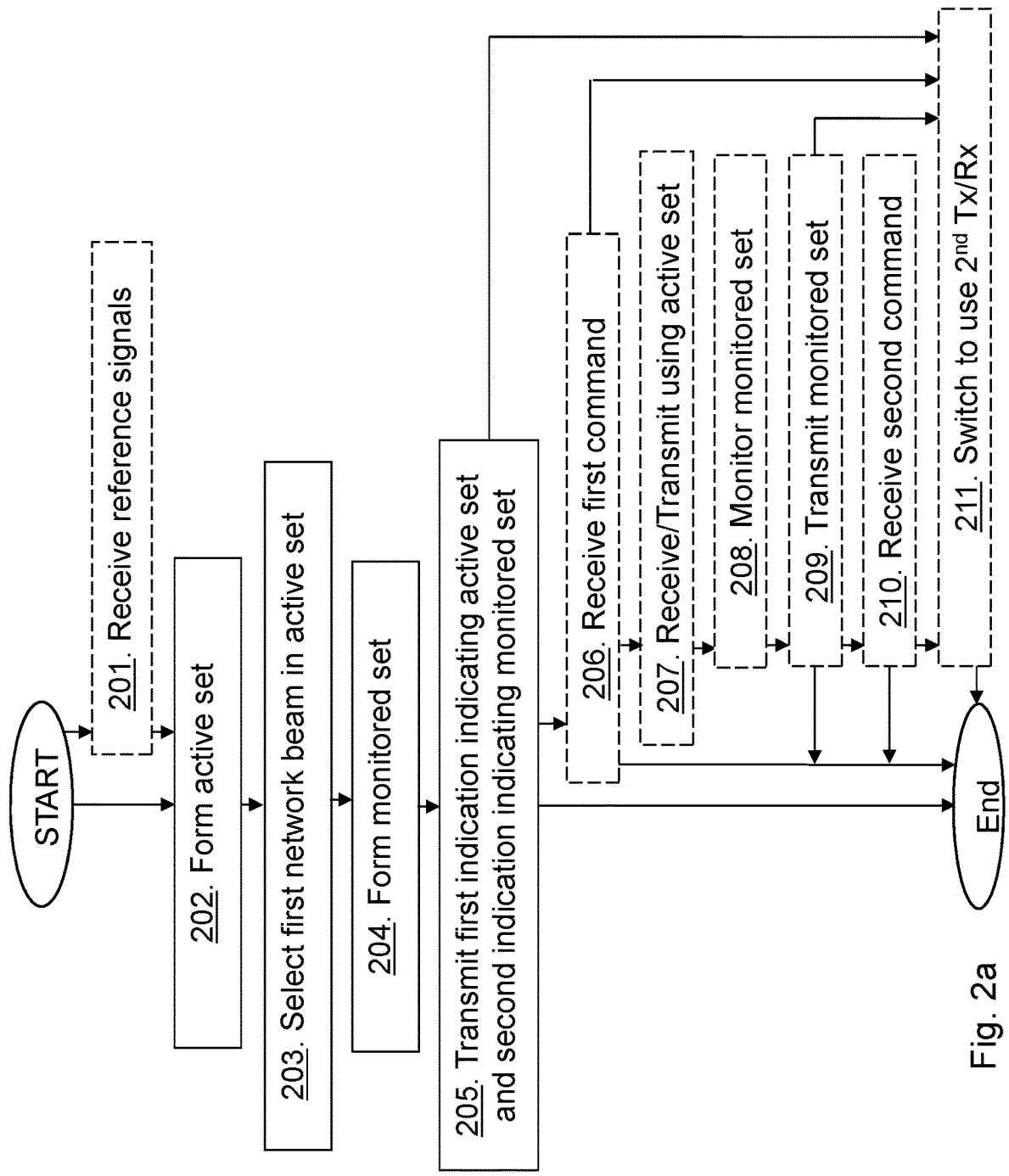
FIG. 2a shows a flowchart depicting a method performed by a wireless device according to embodiments herein.

The method actions performed by the wireless device for managing beam-formed communication in the wireless communication network according to some embodiments will now be described with reference to a flowchart depicted in FIG. 2a. The actions do not have to be taken in the order stated below, but may be taken in any suitable order. Actions performed in some, but not necessarily all, embodiments are marked with dashed boxes. The wireless device is configured to handle separate directional device beams at the wireless device 10. Thus, the wireless device may comprise one or more panels that when activated may receive data over one or a number of device beams.

Action 201. The wireless device 10 may receive reference signals such as BRSs from the network node or a plurality of network nodes. Hence, the wireless device 10 may receive, for each separate directional device beam, reference signals, such as BRS, transmitted in separate directional network beams from the network node 12.

Action 202. The wireless device 10 forms the active set for the first device beam out of the separate directional device beams of the wireless device by selecting one or more first network beams out of a plurality of separate directional network beams of the wireless communication network 1. The one or more first network beams are selected based on received signal strength or quality, and the active set is to be used for transmission or reception of data, at the wireless device 10. E.g. the first network beams may be selected when compared to other first network beams for the first device beam or a different device beam. Active sets are shown in FIGS. 3a-3c. It should be noted that an active set may comprise one network beam and one device beam.

Action 203. The wireless device 10 selects a first network beam in the active set as a preferred network beam for transmission or reception of data. E.g. the wireless device may select one network beam out of the one or more network beams of the formed active set e.g. being the network beam with a measured signal strength or quality above the others or above a first threshold.

Action 204. The wireless device 10 further forms the monitored set, also referred to as a candidate set or candidate beam set, for a second device beam out of the one or more separate directional device beams of the wireless device 10 by selecting one or more second network beams out of the plurality of separate directional network beams of the wireless communication network 1. The one or more second network beams are selected based on received signal strength or quality at the wireless device 10, but are not to be currently used for the transmission or reception of data. The one or more second network beams may be used for the purpose of discovering new beams and to prepare for more drastic changes in the beam selection than what is possible within the active set only. Furthermore, one or more of the second network beams may be the same as one or more of the first network beams.

Action 205. In addition, the wireless device 10 further transmits, to the network node 12, a first indication of the preferred network beam and the received signal strengths or qualities for the one or more first network beams in the formed active set for the first device beam of the wireless device 10. The wireless device 10 also transmits a second indication indicating the one or more second network beams of the formed monitored set for the second device beam of the wireless device 10 and the received signal strengths or qualities for the one or more second network beams in the formed monitored set for the second device beam of the wireless device 10. The wireless device may e.g. transmit identifications of the network beams and identity of the device beam and signal strengths or qualities of each pair of network-device beam.

Action 206. The wireless device 10 may further, after transmitting the first indication of the preferred network beam, receive from the network node 12 a command to use the indicated preferred network beam and the first device beam for transmission or reception of data.

Action 207. The wireless device 10 may transmit to, or receive from, the network node 12 signaling or data using the preferred network beam and the first device beam.

Action 208. The wireless device 10 may further monitor the received signal strength or quality measurements of the one or more second network beams and the second device beam in the monitored set. I.e. the wireless device monitors the monitored set.

Action 209. The wireless device 10 may then transmit the monitored or updated received signal strength or quality measurements to the network node 12, i.e. transmit to the network node 12 the monitored received signal strength or quality measurements of the monitored set.

Action 210. Furthermore, the wireless device 10 may receive a second command from the network node 12 ordering the wireless device 10 to use a second network beam of the monitored set and the second device beam of the monitored set for transmission or reception of data.

Action 211. The wireless device 10 may switch to use, as a result of, or in response to, receiving the second command, for signaling or data transmission, the second network beam and the second device beam of the monitored set, thus, switching the monitored set to be an active set.

The wireless device may in some embodiments switch to use for transmission or reception of data the second device beam in the monitored set when the first network beam is a second network beam out of the one or more second network beams and when received signal strength or quality of the first network beam and the second device beam in the monitored set is higher than the received signal strength or quality of the first network beam and the first device beam in the active set.

It should be noted that the discovering, forming, and transmitting the indications of the sets may be performed as one function and it may be up to the network node to decide which set is to be active and which one or more is to be monitored.

By providing the active set and the monitored set to the network node an efficient and rapid change of beam pair, i.e. network beam and device beam used, is enabled.

Figure 2B:
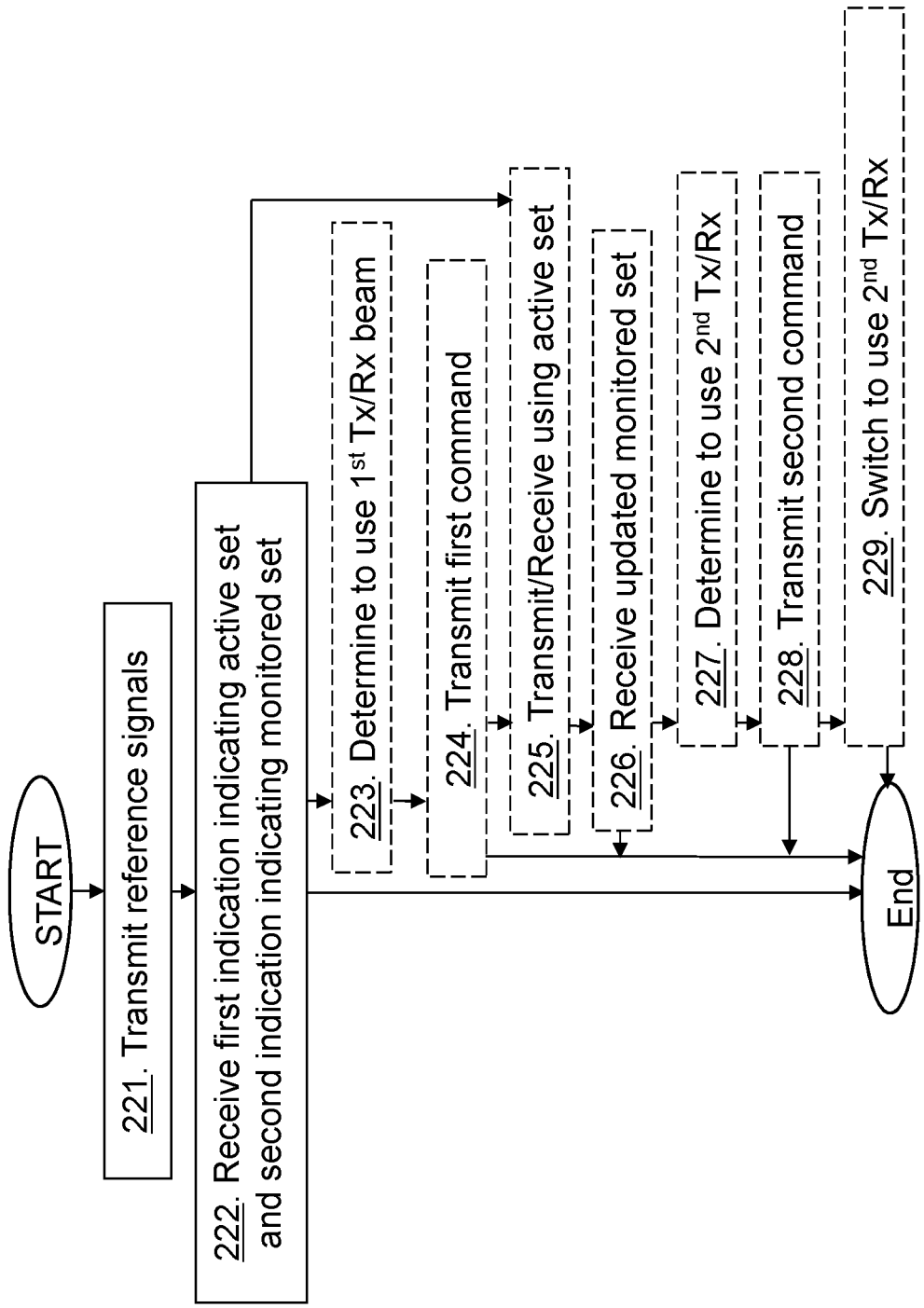
FIG. 2b shows a flowchart depicting a method performed by a network node according to embodiments herein.

The method actions performed by the network node 12 for managing beam-formed communication with the wireless device 10 in the wireless communication network 1 according to some embodiments will now be described with reference to a flowchart depicted in FIG. 2b. The actions do not have to be taken in the order stated below, but may be taken in any suitable order. Actions performed in some, but not necessarily all, embodiments are marked with dashed boxes.

Action 221. The network node 12 transmits, to the wireless device 10, a respective reference signal, such as BRS, in separate directional network beams.

Action 222. The network node 12 receives, from the wireless device 10, the first indication of the preferred network beam out of the plurality of separate directional network beams of the wireless communication network including the separate directional network beams of the network node 12. The network node 12 further receives the signal strengths or qualities for the one or more first network beams in the formed active set for the first device beam of the wireless device 10. In addition, the network node 12 receives the second indication indicating the one or more second network beams of the formed monitored set for the second device beam of the wireless device 10 and the signal strengths or qualities for the one or more second network beams in the formed monitored set for the second device beam of the wireless device 10.

Action 223. The network node 12 may, after receiving the first indication of the preferred network beam in the active set, determine to use the preferred network beam in the active set and the first device beam of the wireless device, e.g. since previously used or indicated to work. The network node 12 may decide to use a different network beam in the active set and indicate this network beam as the preferred network beam. It should be noted that the network node may receive a number of reported active/monitored sets from the wireless device 10 and may determine which active set or monitored set is to be used for communication and thus determine which set to be the active set and which set is to be monitored set. The received report may not necessarily directly state which set is the active set and which set is monitored, this may be a decision in the network node. For example, a first beam report may result in the network node 12 making that beam active. After a while, a second beam report may cause the network node to make that beam monitored. After further a while, the network node may decide to make the monitored beam active instead of the previously active beam.

Action 224. The network node 12 may then transmit the first command to use the preferred network beam and the first device beam of the active set for transmission or reception of data.

Action 225. The network node 12 may in some embodiments transmit to, or receive from the wireless device 10, signaling or data using the preferred network beam and the first device beam of the wireless device 10.

Action 226. The network node 12 may then receive from the wireless device 10 updated signal strength or quality measurements of the monitored set of the wireless device 10.

Action 227. The network node 12 may determine to use, for transmission or reception of data, the second network beam of the monitored set and the second device beam of the monitored set based on the updated received signal strength or quality measurements. E.g. when the updated received signal strength for the second network beam and the second device beam of the monitored set is above a threshold or higher than the signal strength or quality of the preferred network beam and the first device beam of the active set.

Action 228. The network node 12 may then transmit the second command to the wireless device ordering the wireless device 10 to use the second network beam of the monitored set and the second device beam of the monitored set for transmission or reception of data, thus making the monitored set a new active set.

Action 229. The network node 12 may switch to use, for signaling or data transmission, the second network beam and the second device beam of the monitored set, i.e. the new active set.

Active Set

An active set or active beam set is defined herein as a set of one or more device beams of a wireless device and network beams of the wireless communication network. Within this set, one or more, depending on configuration, network and device beam(s) are selected, meaning that these are used for reception of e.g. Physical Downlink Control Channel (PDCCH) and Physical Downlink Shared Channel (PDSCH), for transmission of e.g. Physical Uplink Shared Channel (PUSCH), and/or for BRSRP measurement.

It is assumed that an analog beamforming is used in the wireless device 10 but embodiments herein may also be used in or for digital beamforming. However, illustrated embodiments below are exemplified using analog beamforming using panels at the wireless device 10. Hence each panel of the wireless device is capable of producing one device beam of the active set at any given time. In some embodiments, the wireless device has one panel and hence is capable of one device beam at a time. In other embodiments, the wireless device has more than one panel, e.g., two panels, and may hence be associated with more than one device beam, e.g., two device beams.

Further, each device beam in the active set may be associated with one or more network beams at any given time. In some embodiments, single stream transmissions are used and the active set will contain one selected network beam. In other embodiments, multi-stream, e.g., dual-stream, transmissions are used and the active set may contain multiple, e.g., two, network beams. These one or more network beams are then receivable with the selected device beams by the wireless device 10.

FIG. 3a-3b depicts two embodiments of the wireless device 10 forming an active set. In FIG. 3a, the wireless device 10 has a single panel, and hence a single device beam. The BRSRP of several network beams is measured, and the strongest one is selected. In this case, network beams denoted as N2, N3 and N4 are reported, and network beam N3 is selected. The active set thus comprises the network/device beam pair N3, U3. In FIG. 3b, the wireless device 10 has two panels, and hence two device beams. The BRSRP of several network beams for each device beam is measured, and the strongest one is selected. In this case, network beams denoted as N2, N3, and N4 are reported as measured by device beam U3, and network beam N3 is selected. Additionally, network beams N4, N5, and N6 are reported as measured by device beam U10, and network beam N5 is selected. The active set, circled in figures, thus comprises the network/device beam pairs N3, U3; and N5, U10.

The BRSRP is reported for the selected network beams in the active set. In some embodiments, these are the only network beams for which the BRSRP is reported. In some other embodiments, only the selected beam(s) in the active set have BRSRP reports. In yet some other embodiments, the BRSRP for additional network beams, which are not part of the active set, may also be reported. The measurements are used using the selected device beams in the active set.

Monitored Set

The monitored set is similar to the active set as described above, and contains one (or more) selected device beam(s)

and one (or more) selected network beam(s) for which BRSRP reports are provided. Also here, the BRSRP for additional network beams not being the selected ones are possible.

FIG. 3c depicts an active set, circled in figures, comprising the network/device beam pair N3, U3, and additionally a monitored set, dashed circled in figures, comprising the network/device beam pair N6, U1.

A key difference between the active set and the monitored set is that the selected beams in the monitored set are not used for reception and transmission. Instead the monitored set is used for the purpose of discovering new beams and to prepare for more drastic changes in the beam selection than what is possible within the active set only, as described in greater detail herein.

Initial Beam Selection

Figure 4A:
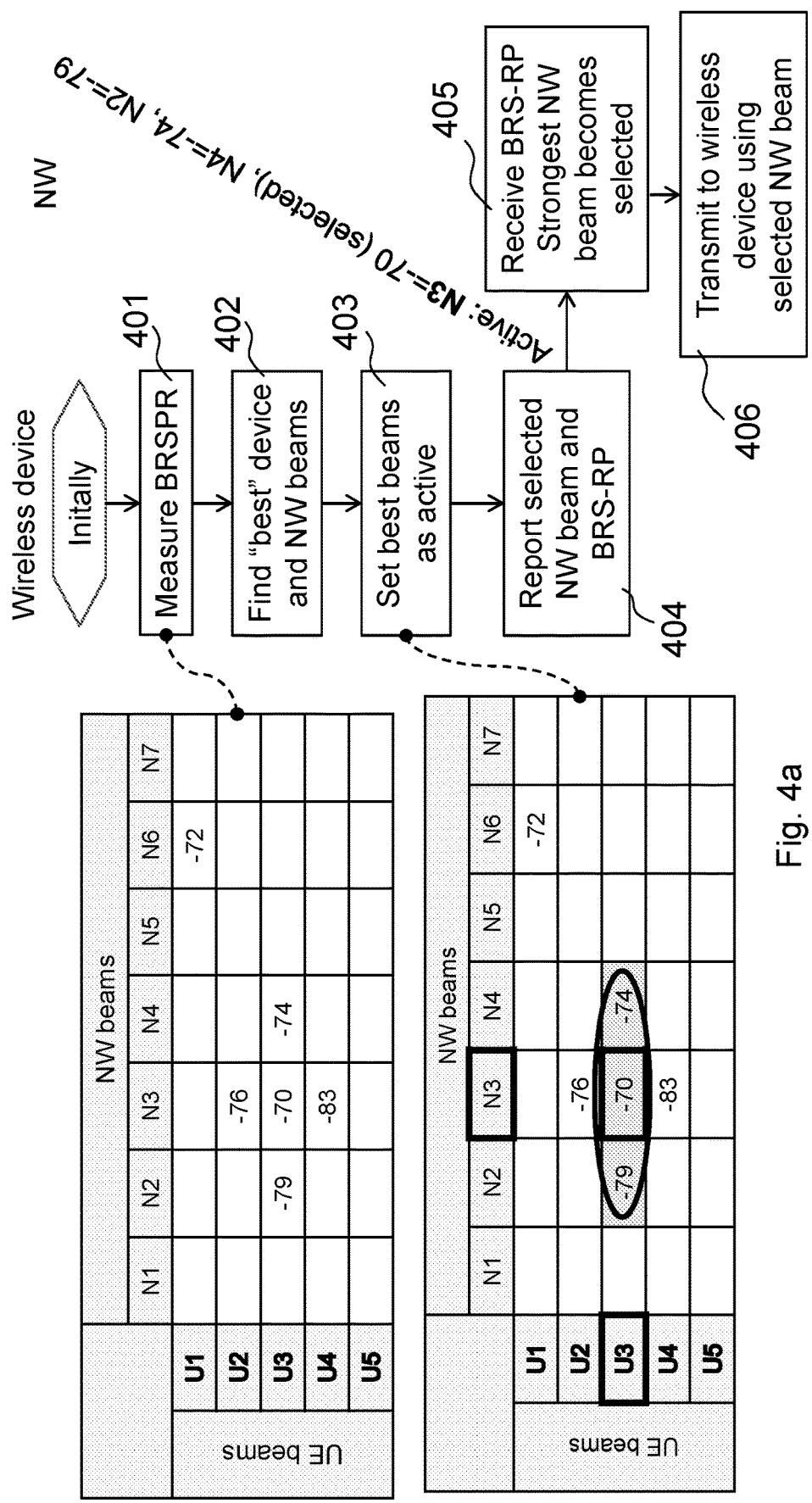
FIG. 4a depicts a process of initial beam selection for the active set.

This section describes the process of populating the active set, which is initially empty. The process is depicted in FIG. 4a.

In principle, the wireless device 10 will measure the entire matrix of BRSRP values for all pairs of device beams and network (NW) beams, action 401. In practice however, the wireless device may start with a coarse subset resulting in a suboptimal selection, which will need to be refined later.

First, the wireless device must decide how many panels (and hence streams) to activate. In some embodiments this is wireless device autonomous, whereas in other embodiments it is controlled by the network, such as by higher layer signaling. The wireless device 10 may find the best or strongest device beam and network (NW) beams, action 402. The wireless device 10 may then set these as the active set, action 403. Thus, for each activated panel, the wireless device 10 may select a device beam and report the BRSRP for one of the few strongest network beams, using the selected device beam, action 404. The strongest reported network beam is then considered the selected network beam for each panel (and hence each device beam), see action 405. These wireless device and network beam(s) then become the active set, and the network node may use the selected NW beam to transmit to the wireless device 10, action 406. In the figure network beam N3 is selected and network beams N2 and N4 are in the active set.

In some embodiments, the wireless device will include the device beam identity in BRSRP reports, which may be useful for, e.g., error detection and debugging purposes. In other embodiments, the wireless device only reports the network beam identities.

Beam Tracking of the Active Set

Once the active set has been initialized, as described above, it is updated as time progresses, e.g., to account for mobility, channel changes, and the like. The wireless device continues to measure BRSRP; in principle it measures an entire matrix of device beams and network beams. For each active wireless device panel, the wireless device then updates the selected device beam, making sure that the selected network beam can still be received. Typically this means updating in small steps. In one embodiment, the wireless device is allowed to update the selected device beam, e.g. only, as long as it improves or maximizes the reception of the selected network beam. The wireless device will then report the BRSRP for a few of the strongest network beams using selected device beam. The strongest reported network beam becomes the new selected network beam for each panel, and hence, for the device beam.

Figure 4B:
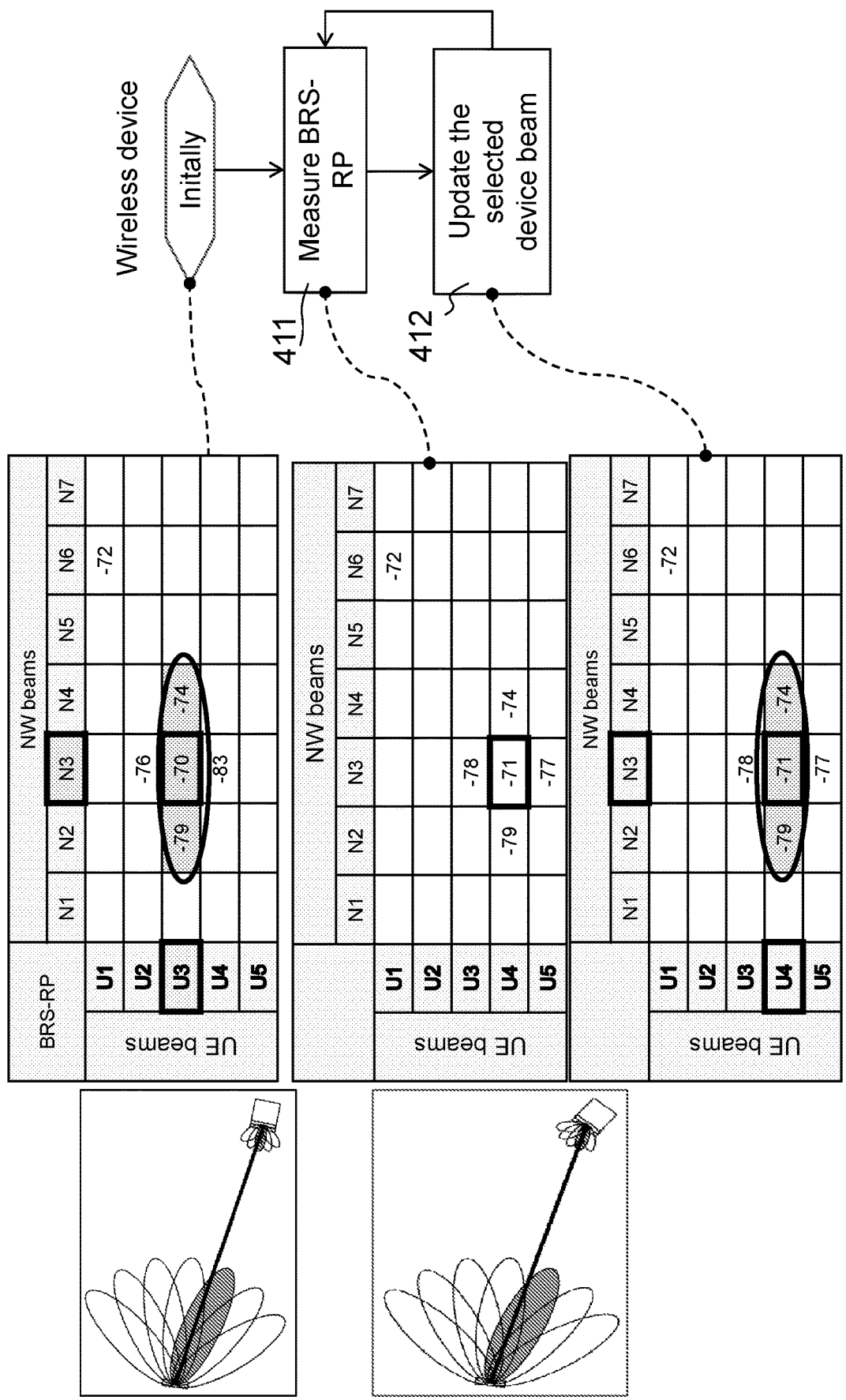
FIG. 4b depicts a process of tracking beam strength in the active set.

FIG. 4b depicts this process. Initially, the active set comprises device beam U3 and network beams N2, N3, and N4, with the network/device beam pair N3, U3 being selected as the preferred network beam and device beam. A time later, the wireless device 10 measures BRSRP of all network beams, using all device beams, and discovers that device beam U4 has better reception of the selected network beam N3, action 411. The wireless device 10 updates the active set to include device beam U4 and network beams N2, N3, and N4, with the network/device beam pair N3, U4 being selected, action 412. The wireless device need not necessarily update the network about the change in device beam selection, since the same network beam remains selected.

Figure 4C:
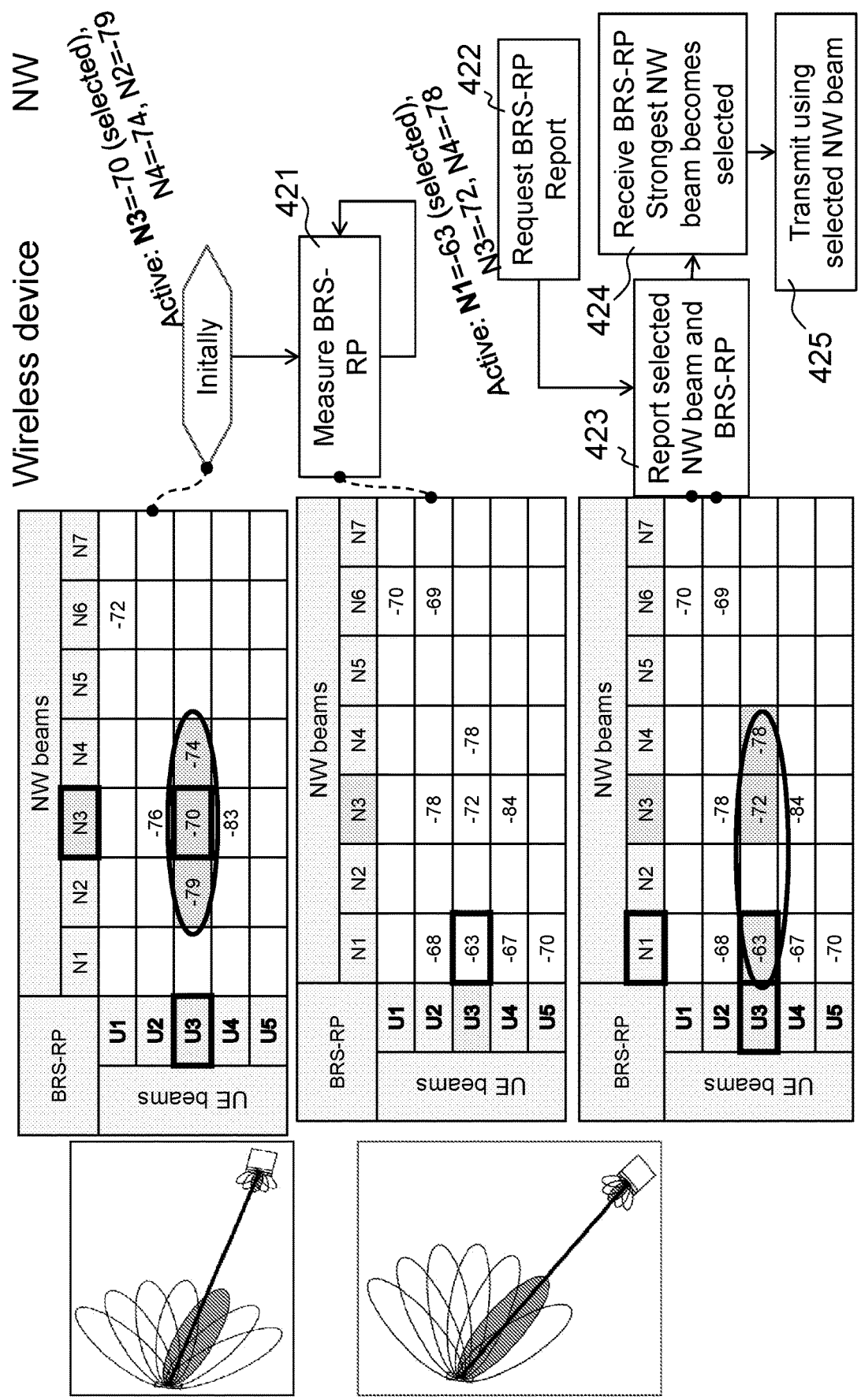
FIG. 4c depicts a process of updating the selected network beam.

FIG. 4c depicts the beam tracking process when the selected network beam changes. Initially, as in FIG. 4b, the active set comprises device beam U3 and network beams N2, N3, and N4, with the network/device beam pair N3, U3 being selected. A time later, the wireless device 10 measures BRSRP of all network beams, action 421, using all device beams, and discovers that, while device beam U3 still has the best reception, it receives network beam N1 more strongly than N3. The wireless device 10 updates the active set to maintain beam U3, and to include network beams N1, N3, and N4, with the network/device beam pair N1, U3 now being selected. In this case, the wireless device 10 must report the new selected beam pair to the network node 12, so that it can transmit downlink signaling and data to the wireless device 10 on network beam N1. In one embodiment, the wireless device will report the selection of N1, but continue to monitor N3, until the network sends down a change beam command to switch to N1. The network node may request the wireless device 10 for BRS-RP reports, action 422. The wireless device 10 may report the selected network beam and device beam, action 423. The network node 12 may then receive the BRS-RP and the network beam with the strongest BRS-RP may then become selected at the network node 12, see action 424. The network node 12 may then transmit data on the selected network beam to the wireless device 10, action 425.

The wireless device 10 must ensure that the previous selected network beams are still receivable by the wireless device 10 until the network has been notified. A delay or handshake may thus in some cases be necessary to ensure robustness.

Finding New Beams Using the Monitored Set

During its periodic measurements, the wireless device 10 may detect network beams that cannot be received on the currently selected device beams. In such case, these network beams are reported as monitored set selections, similar to what is done for the active set as discussed above. Several such monitored beam selections may be maintained independently. Network beams in the monitored set are normally not used for reception or transmission. The wireless device 10 will report this 'Monitored Beams Set' to the network node 12.

Figure 4D:
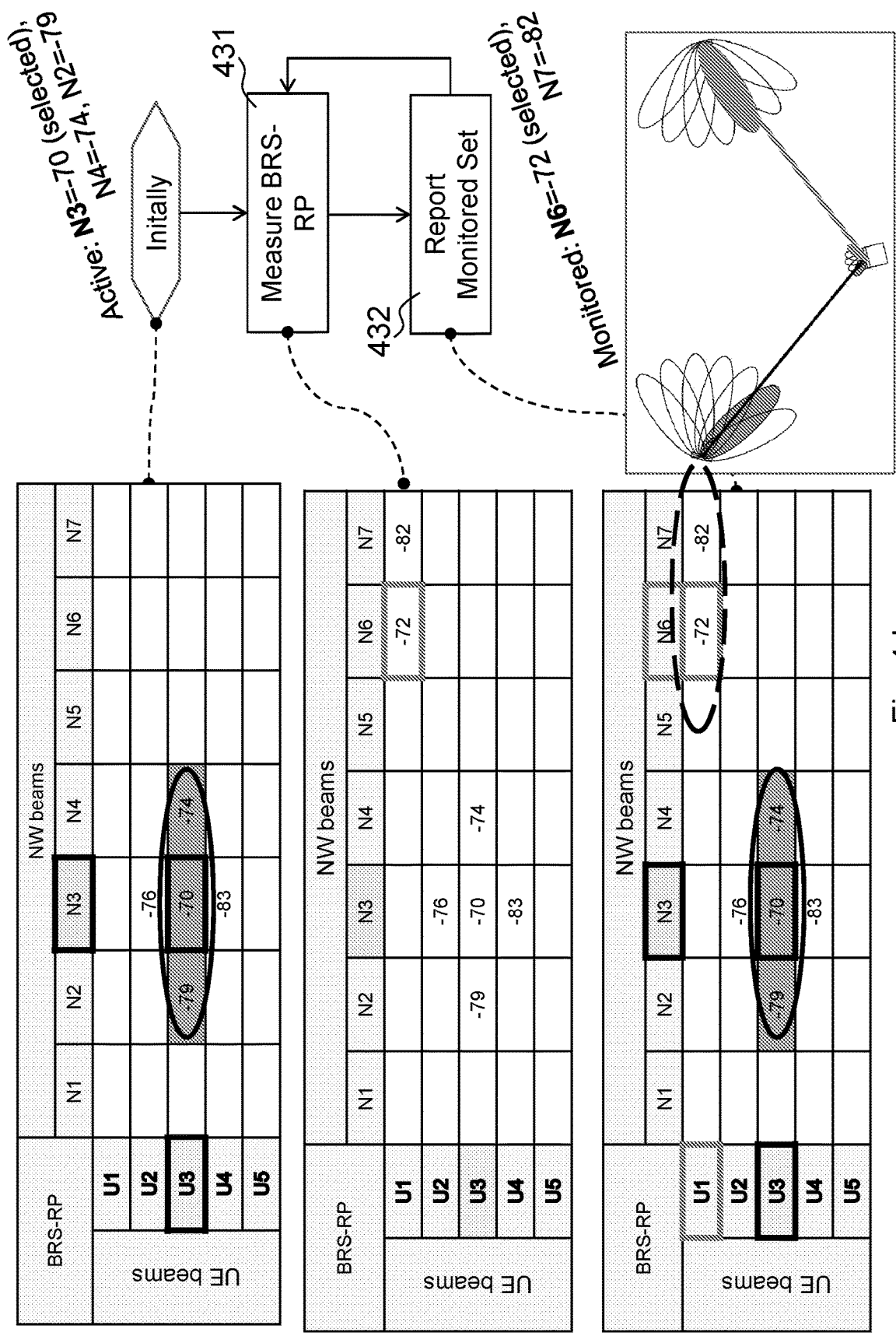
FIG. 4d depicts a process of discovering and adding beams to a monitored set.

FIG. 4d depicts the discovery, and addition to the monitored set, of network beams. Initially, an active set is established, initialized, and reported to the network, as described above. Upon a periodic measurement of BRSRP across the full (network beam, device beam) matrix, a new network beams N6 and N7 are discovered, action 431. N6 has the best reception strength on device beam U1, and is selected. The network/device pair N6, U1 is reported to the network, along with network beam N7, action 432. That is, the wireless device 10 reports the second indication to the network node 12, see e.g. action 205 above.

Monitored Beam Switch

Figure 5:
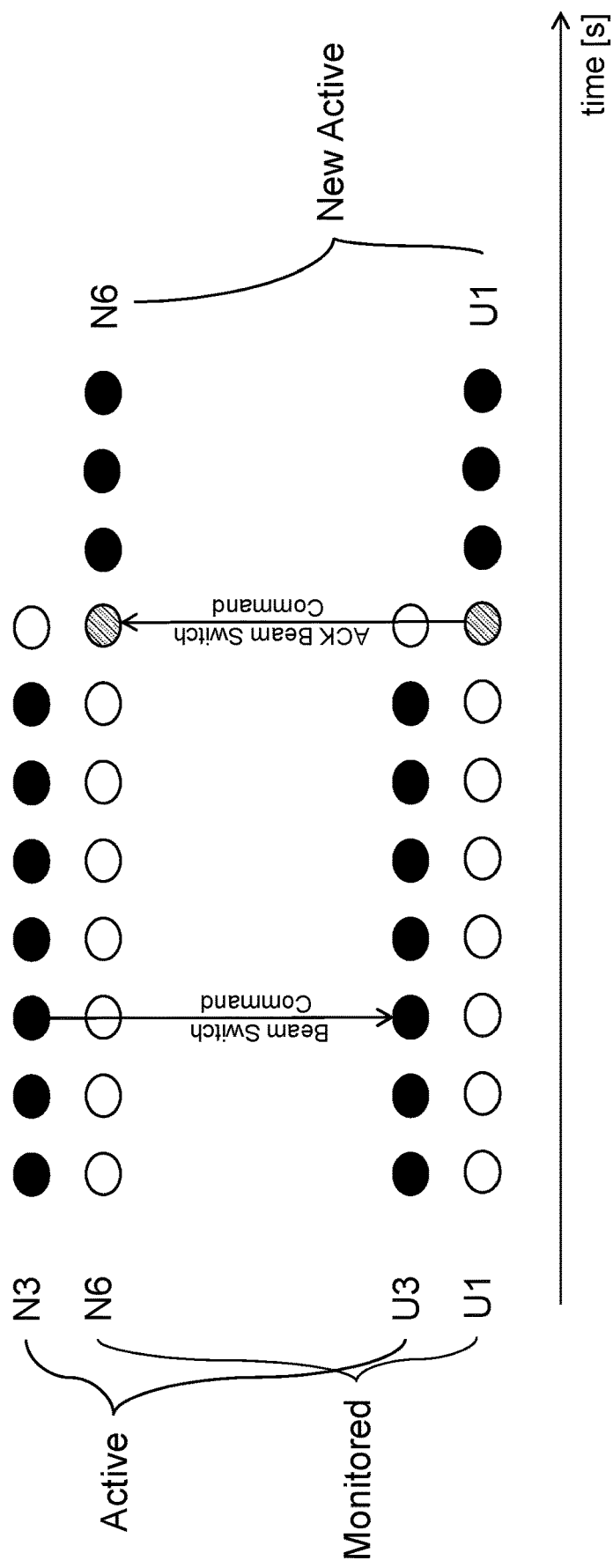
FIG. 5 depicts a process switching from an active set to a monitored set.

After the wireless device 10 has formed a monitored set, and notified the network node 12 of BRSRP of the network beams in the active and monitored sets, the network node 12 may command the wireless device 10 to switch the two— that is, make the selected network/device beam pair in the monitored set the new active set. In one embodiment, this process occurs as follows, as depicted in FIG. 5. FIG. 5 discloses an exemplification of alternation in beams switch procedure. The filled circles indicate the usage of that beam, wherein black solid is 'Active' whereas hashed is 'monitored'.

On the network side, the network sends a beam switch command to the wireless device on the selected network beam of the active set (N3, U3). In one embodiment, the command may be repeated multiple times to increase robustness. The network waits for an acknowledgement (ACK) of the beam switch command from the UE, monitoring the selected beam in the monitored set (N6). Upon receipt of the ACK, the network replaces the old active set with the monitored set (N6, U1), which then becomes the new active set. If no ACK is received, the network continues to transmit on the network beam selected in the old active set (N3, U3).

On the wireless device side, the wireless device receives the beam switch command from the network, and sends an acknowledgement (ACK) on the selected beam(s) of the monitored set (N6, U1). In one embodiment, the ACK may be repeated multiple times to increase robustness. The wireless device replaces the old active set (N3, U3) with the monitored set (N6, U1), which becomes the new active set. Subsequent transmission/reception is via the selected beam of the new active set.

In some embodiments, the beam switch command may include an explicit indication of a switch time, or the time duration after this command is sent, upon which the switch will occur. Alternatively, this could be implicitly understood by, e.g., configuration from the specifications and/or higher layer signaling.

In some embodiments, an indication that the switch has occurred—that is, that the monitored set has replaced the old active set, and is now the new active set—may be indicated by the network to the wireless device by explicit signaling, such as by toggling a flag in the Downlink Control Information (DCI) in subsequent transmissions to the wireless device 10.

Note that the above example assumes that the entire old active set is replaced by the entire monitored set to become the new active set. In some embodiments, only the selected beam(s) of the set are replaced. In other embodiments, a step-wise approach may be employed wherein the beams in the monitored set are added one-by-one to the active set, and consequently also removed from the monitored set. In such case, the beam switch command will include explicitly which beam(s) are to be added/removed from the respective sets in a rather straightforward extension to the above-described procedure. Furthermore, both sets could be overlapping in the sense that the same network beam is represented in both sets.

In some embodiments, the wireless device is allowed to autonomously switch to the monitored beams if the measured received power of the selected beam(s) of the active set fall below a predefined or preconfigured threshold. In a further embodiment, this event triggers a re-establishment procedure where the wireless device performs a random access in order to re-connect to the network.

Figure 6:
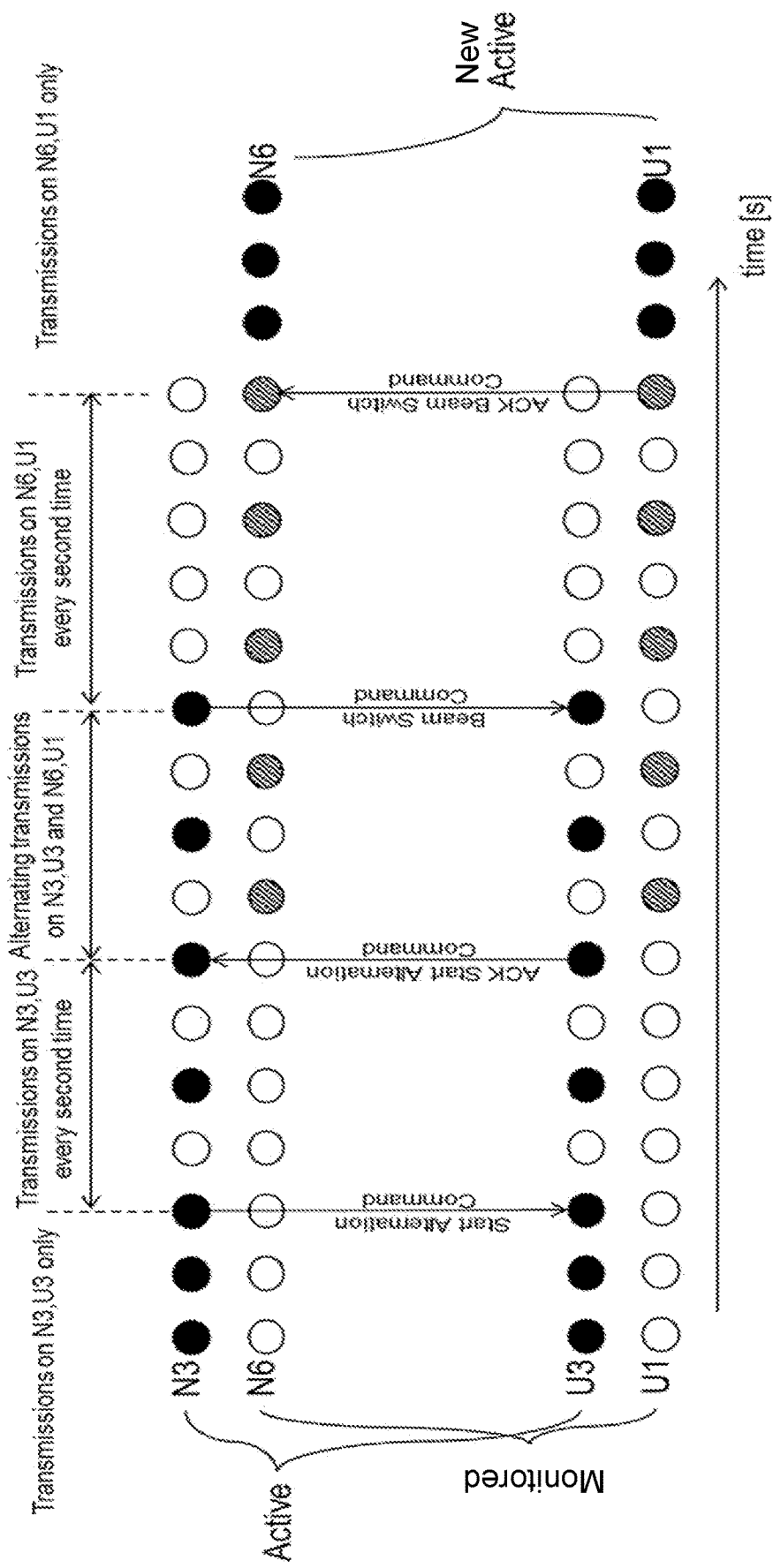
FIG. 6 depicts a process of alternating subframes in a beam switch procedure.

FIG. 6 depicts a variation on the active-to-monitored set switch procedure described above, in which the switch-over occurs initially only on alternating subframes, or any other defined period. Many potential error cases of the procedure may be alleviated in this embodiment. The procedure is performed as follows:

1. The network node 12 stops scheduling odd subframes (DL and UL).
2. The network node 12 may command the wireless device 10 to switch to monitored beams on odd subframes.
3. The wireless device 10 starts using monitored beams on odd subframes.
4. The wireless device 10 confirms that it is using monitored beams on odd subframes.
5. The network node 12 starts using monitored beams on odd subframes.
6. The network node 12 stops scheduling even subframes.
7. The network node 12 commands the wireless device 10 to switch to monitored beams on all subframes (even and odd).
8. The wireless device 10 starts using the monitored beams on all subframes.
9. The wireless device 10 confirms that it is using monitored beams i.e. the new active set, on all subframes.
10. The network node 12 starts using monitored beams, the new active set, on all subframes.

FIG. 6 discloses an exemplification of alternation in beams switch procedure. The filled circles indicates the usage of that beam, wherein black solid is 'Active' whereas hashed is 'monitored'.

Hardware

Figure 7:
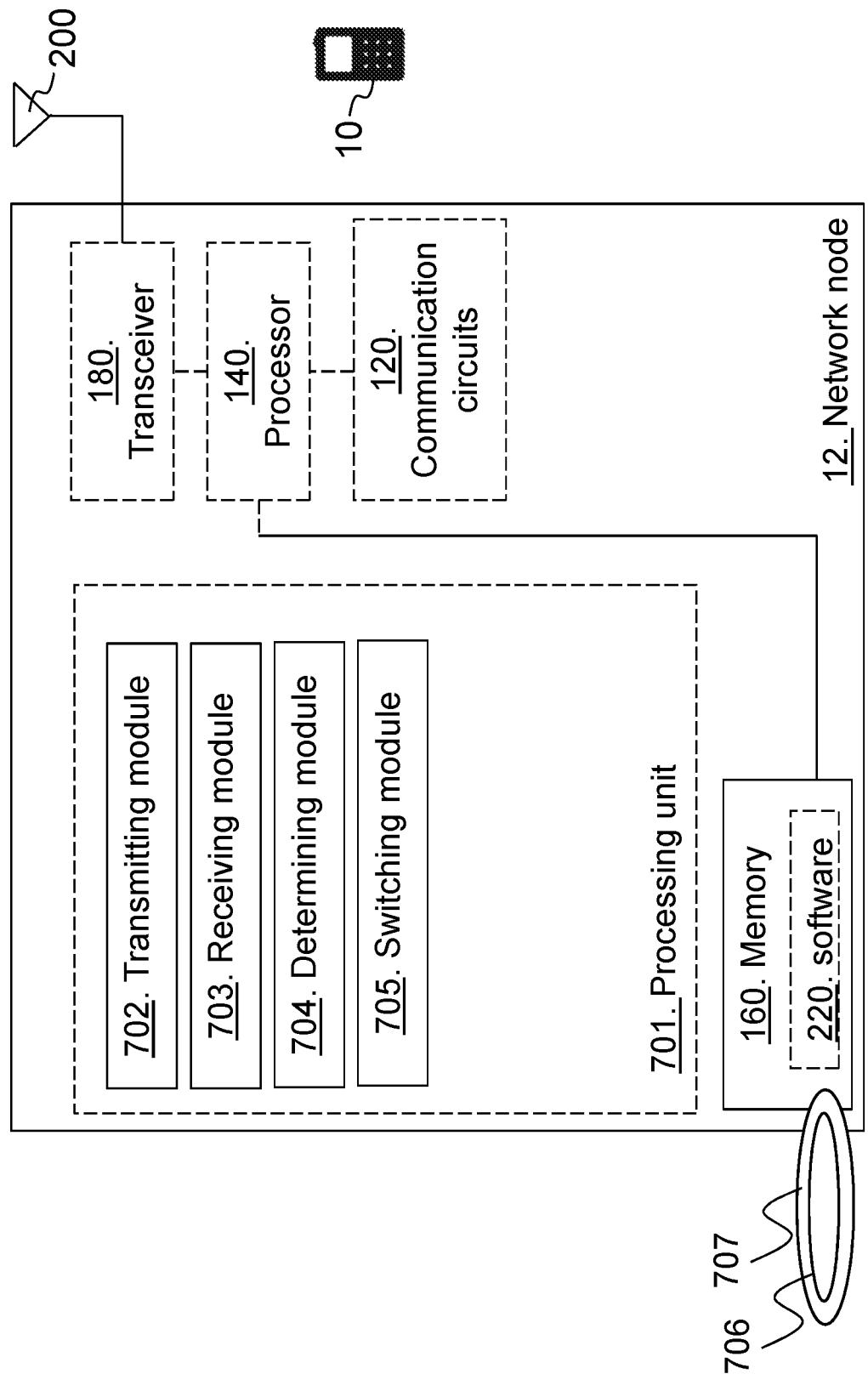
FIG. 7 is a functional block diagram of a network node.

FIG. 7 depicts the network node 12 operative in embodiments herein for managing beam-formed communication with the wireless device 10 in the wireless communication network 1.

The network node 12 may comprise processing circuitry or a processing unit 701, e.g. one or more processors, being configured to perform the embodiments herein.

The network node 12 may further comprise a transmitting module 702 e.g. a transceiver or transmitter. The network node 12, the processing unit 701, and/or the transmitting module 702 is configured to transmit to the wireless device 10, the respective reference signal in the separate directional network beams, e.g. one or more BRSs.

The network node 12 may further comprise a receiving module 703 e.g. a transceiver or receiver. The network node 12, the processing circuitry or the processing unit 701, and/or the receiving module 703 is configured to receive from the wireless device 10, the first indication of the preferred network beam out of the plurality of separate directional network beams of the wireless communication network including the separate directional network beams of the network node 12, and signal strengths or qualities for the one or more first network beams in the formed active set for the first device beam of the wireless device 10. The network node 12, the processing circuitry or the processing unit 701, and/or the receiving module 703 is further configured to receive from the wireless device 10, the second indication indicating the one or more second network beams of the formed monitored set for the second device beam of the wireless device 10 and the signal strengths or qualities for the one or more second network beams in the formed monitored set for the second device beam of the wireless device 10.

The network node 12 may further comprise a determining module 704. The network node 12, the processing circuitry or the processing unit 701, and/or the determining module 704 may be configured to, after receiving the first indication of the preferred network beam in the active set, determine to use the preferred network beam in the active set and the first device beam of the wireless device 10 for transmission or reception of data.

The network node 12, the processing circuitry or the processing unit 701, and/or the transmitting module 702 may be configured to transmit to the wireless device 10, the first command to use the preferred network beam and the first device beam of the active set for transmission or reception of data.

The network node 12, the processing circuitry or the processing unit 701, and/or the transmitting module 702 may be configured to transmit to the wireless device 10, signaling or data using the preferred network beam and the first device beam of the wireless device 10.

The network node 12, the processing circuitry or the processing unit 701, and/or the receiving module 703 may be configured to receive from the wireless device 10, signaling or data using the preferred network beam and the first device beam of the wireless device 10.

The network node 12, the processing circuitry or the processing unit 701, and/or the receiving module 703 may then be configured to receive from the wireless device 10 updated signal strength or quality measurements of the monitored set of the wireless device 10.

The network node 12, the processing circuitry or the processing unit 701, and/or the determining module 704 may be configured to determine to use, for transmission or reception of data, the second network beam of the monitored set and the second device beam of the monitored set based on the updated received signal strength or quality measurements. I.e. making the monitored set to the new active set.

The network node 12, the processing circuitry or the processing unit 701, and/or the transmitting module 702 may be configured to transmit to the wireless device 10, the second command ordering the wireless device 10 to use the second network beam of the monitored set and the second device beam of the monitored set for transmission or reception of data.

The network node 12 may further comprise a switching module 705. The network node 12, the processing circuitry or the processing unit 701, and/or the switching module 705 may be configured to switch to use, for signaling or data transmission, the second network beam and the second device beam of the monitored set.

The network node 12 may implement base station functionality in the network. As those of skill in the art are aware, a base station is a network node providing wireless communication services to one or more wireless devices in a geographic region (known as a cell or sector). The network node 12 in LTE is called an e-NodeB or eNB; however embodiments herein are not limited to LTE or eNBs. The network node 12 may be a node in a network providing wireless access to the wireless device 10.

The network node 12 includes communication circuits 120 operative to exchange data with other network nodes; a processor 140; memory 160; and radio circuits, such as a transceiver 180, one or more antenna arrays 200, and the like, to effect wireless communication across an air interface to one or more wireless devices. According to embodiments herein, the memory 160 is operative to store, and the processor 140 operative to execute, software 220 which when executed is operative to cause the network node 12 to manage beamforming and communication with wireless devices via selected network/device beam pairs, as described herein.

The network node 12 further comprises the memory 160. The memory comprises one or more units to be used to store data on, such as SINR, SNR, commands, active sets, monitored sets, antenna node configurations, wireless device capabilities, applications to perform the methods disclosed herein when being executed, and similar.

The methods according to the embodiments described herein for the network node 12 may be implemented by means of e.g. a computer program 706 or a computer program product, comprising instructions, i.e., software code portions, which, when executed on at least one processor, cause the at least one processor to carry out the actions described herein, as performed by the network node 12. The computer program 706 may be stored on a computer-readable storage medium 707, e.g. a disc or similar. The computer-readable storage medium 707, having stored thereon the computer program, may comprise the instructions which, when executed on at least one processor, cause the at least one processor to carry out the actions described herein, as performed by the network node 12. In some embodiments, the computer-readable storage medium may be a non-transitory computer-readable storage medium.

Figure 8:
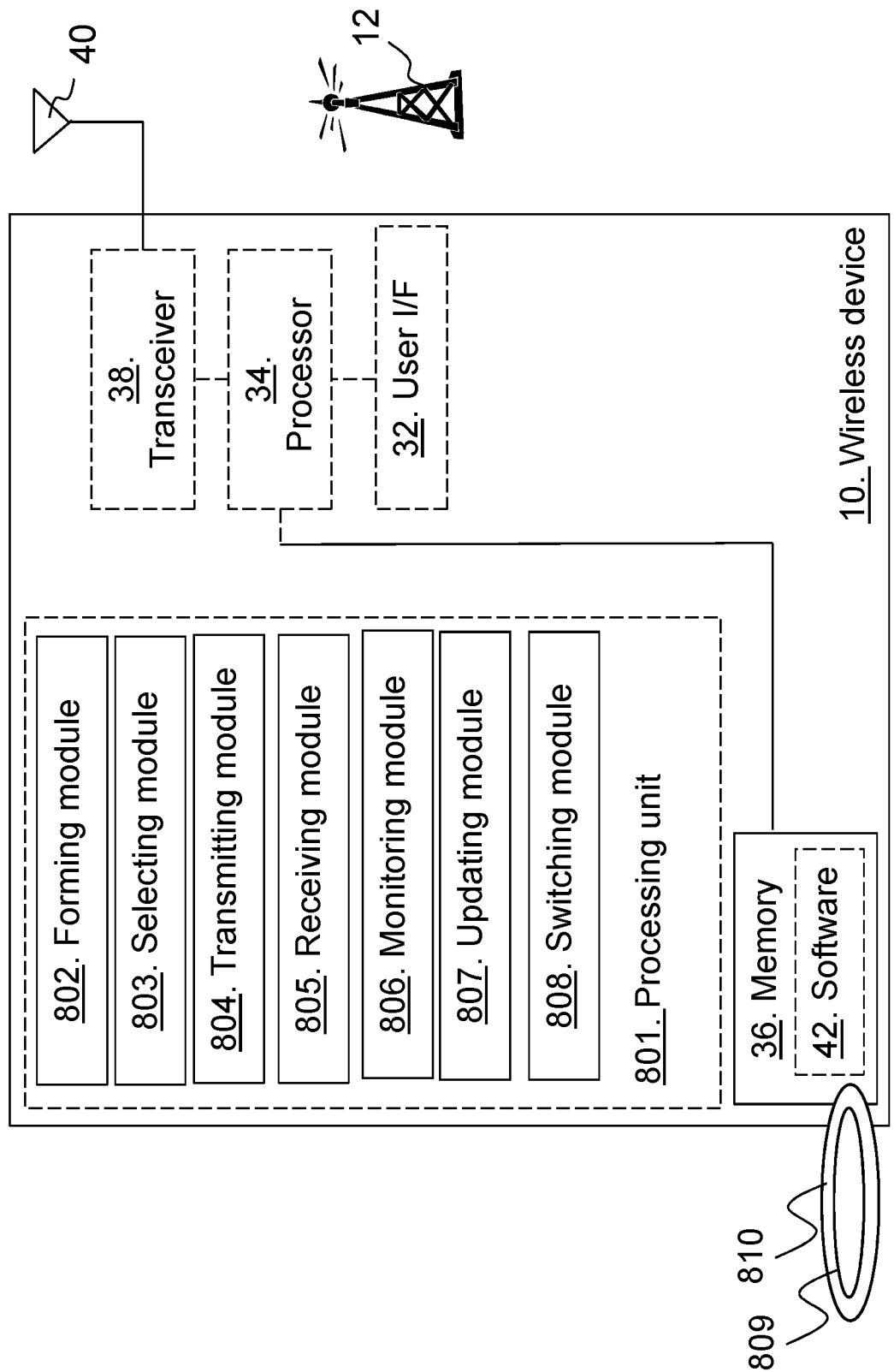
FIG. 8 is a functional block diagram of a wireless device.

FIG. 8 depicts the wireless device 10, such as but not limited to a UE, operative in embodiments herein for managing beam-formed communication in the wireless communication network 1. The wireless device 10 is configured to handle separate directional device beams at the wireless device 10.

The wireless device 10 may comprise processing circuitry or a processing unit 801, e.g. one or more processors, configured to perform the methods herein.

The wireless device 10 may comprise a forming module 802. The wireless device 10, the processing circuitry or the processing unit 801, and/or the forming module 802 is configured to form the active set for the first device beam out of the separate directional device beams of the wireless device by being configured to select one or more first network beams out of a plurality of separate directional network beams of the wireless communication network 1. The one or more first network beams are selected based on received signal strength or quality, and the active set is to be used for transmission or reception of data.

The wireless device 10 may comprise a selecting module 803. The wireless device 10, the processing circuitry or the processing unit 801, and/or the selecting module 803 is configured to select the first network beam in the active set as the preferred network beam for transmission or reception of data.

The wireless device 10, the processing circuitry or the processing unit 801, and/or the forming module 802 is further configured to form the monitored set for the second device beam out of the one or more separate directional device beams of the wireless device 10 by being configured to select one or more second network beams out of the plurality of separate directional network beams of the wireless communication network 1. The one or more second network beams are selected based on received signal strength or quality, but are not to be currently used for the transmission or reception of data.

The wireless device 10 may comprise a transmitting module 804. The wireless device 10, the processing circuitry or the processing unit 801, and/or the transmitting module 804 is configured to transmit to the network node 12 the first indication of the preferred network beam and the received signal strengths or qualities for the one or more first network beams in the formed active set for the first device beam of the wireless device 10. The wireless device 10, the processing circuitry or the processing unit 801, and/or the transmitting module 804 is further configured to transmit to the network node 12 the second indication indicating the one or more second network beams of the formed monitored set and the received signal strengths or qualities for the one or more second network beams in the formed monitored set for the second device beam of the wireless device 10.

The wireless device 10 may comprise a receiving module 805. The wireless device 10, the processing circuitry or the processing unit 801, and/or the receiving module 805 may be configured to, after transmitting the first indication of the preferred network beam, receive from the network node 12 the command to use the indicated preferred network beam and the first device beam for transmission or reception of data.

The wireless device 10, the processing circuitry or the processing unit 801, and/or the transmitting module 804 may be configured to transmit to the network node 12, signaling or data using the preferred network beam and the first device beam.

The wireless device 10, the processing circuitry or the processing unit 801, and/or the receiving module 805 may be configured to receive from the network node 12, signaling or data using the preferred network beam and the first device beam.

The wireless device 10 may comprise a monitoring module 806. The wireless device 10, the processing circuitry or the processing unit 801, and/or the monitoring module 806 may be configured to monitor the received signal strength or quality measurements of the one or more second network beams and the second device beam in the monitored set.

The wireless device 10 may comprise an updating module 807. The wireless device 10, the processing circuitry or the processing unit 801, and/or the updating module 807 may be configured to transmit the monitored received signal strength or quality measurements to the network node 12.

The wireless device 10, the processing circuitry or the processing unit 801, and/or the receiving module 805 may be configured to receive the second command from the network node 12 ordering the wireless device 10 to use the second network beam of the monitored set and the second device beam of the monitored set for transmission or reception of data.

The wireless device 10 may comprise a switching module 808. The wireless device 10, the processing circuitry or the processing unit 801, and/or the switching module 808 may be configured to switch to use, for signaling or data transmission, the second network beam and the second device beam of the monitored set.

The wireless device 10, the processing circuitry or the processing unit 801, and/or the switching module 808 may be configured to switch to use the second device beam in the monitored set for transmission or reception of data when the first network beam, i.e. the preferred network beam, is a second network beam out of the one or more second network beams and when received signal strength or quality of the first network beam and the second device beam in the monitored set is higher than the received signal strength or quality of the first network beam and the first device beam in the active set.

Although embodiments herein have been described in the context of a UE, the wireless device 10 is not so limited, and may include a UE, a machine type communication (MTC) device, a machine-to-machine (M2M) device, or any other device operative in a wireless communication network.

The wireless device 10 includes a user interface 32 (display, touchscreen, keyboard or keypad, microphone, speaker, and the like); a processor 34; memory 36; and radio circuits, such a transceiver 38, one or more antenna panels 40, and the like, to effect wireless communication across an air interface to one or more network nodes or base stations such as e-NodeBs 12. The wireless device 10 may additionally include features such as a camera, removable memory interface, short-range communication interface (Wi-Fi, Bluetooth, and the like), wired interface (USB), battery recharge port, and the like (not shown in FIG. 8). According to embodiments herein, the memory 36 is operative to store, and the processor 34 operative to execute, software 42 which when executed is operative to cause the wireless device 10 to measure BRSRP of a plurality of network beams as received by each device beam, to select network and device beams, and include them in one or more active sets and monitored sets, and to communicate with the network via selected network/device beam pairs, as described herein.

The wireless device 10 further comprises the memory 36. The memory comprises one or more units to be used to store data on, such as SINR, SNR, commands, active sets, monitored sets, antenna node configurations, wireless device capabilities, applications to perform the methods disclosed herein when being executed, and similar.

The methods according to the embodiments described herein for the wireless device 10 are respectively implemented by means of e.g. a computer program 809 or a computer program product, comprising instructions, i.e., software code portions, which, when executed on at least one processor, cause the at least one processor to carry out the actions described herein, as performed by the wireless device 10. The computer program 809 may be stored on a computer-readable storage medium 810, e.g. a disc or similar. The computer-readable storage medium 810, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

The processor 140, 34 may comprise any sequential state machine operative to execute machine instructions stored as machine-readable computer programs in the memory, such as one or more hardware-implemented state machines (e.g., in discrete logic, Field-Programmable Gate Array (FPGA), Application Specific Integrated Circuit (ASIC), etc.); programmable logic together with appropriate firmware; one or more stored-program, general-purpose processors, such as a microprocessor or Digital Signal Processor (DSP), together with appropriate software; or any combination of the above.

The memory 160, 36 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

The radio circuits may comprise one or more transceivers 180, 38 used to communicate with other devices via a Radio Access Network according to one or more communication protocols known in the art or that may be developed, such as IEEE 802.xx, CDMA, WCDMA, GSM, LTE, UTRAN, WiMax, or the like. The transceiver 180, 38 implements transmitter and receiver functionality appropriate to the Radio Access Network links (e.g., frequency allocations and the like). The transmitter and receiver functions may share circuit components and/or software, or alternatively may be implemented separately.

The antenna array 200 and antenna panel 40 may comprise any array of antenna elements operative to implement analog beamforming by controlling the relative phase shift of signals transmitted by each antenna element. The network node 12, and/or wireless device 10 may include one or multiple (e.g., two) antenna arrays 200 or antenna panels 40.

The communication circuits 120 may comprise a receiver and transmitter interface used to communicate with one or more other nodes over a communication network according to one or more communication protocols known in the art or that may be developed, such as Ethernet, TCP/IP, SONET, ATM, or the like. The communication circuits 120 implement receiver and transmitter functionality appropriate to the communication network links (e.g., optical, electrical, and the like). The transmitter and receiver functions may share circuit components and/or software, or alternatively may be implemented separately.

According to one or more embodiments described and claimed herein, mechanisms and procedures for network and device beam management are provided, such that the device beam selection is restricted and autonomously, gradually updated in order to sustain a reliable connection for control signaling and data transmission/reception, while also allowing for unrestricted and rapid mobility in a robust fashion.

One embodiment relates to a method of beamform operation by a wireless device operative in a wireless communication network. One or more antenna panels, each operative to receive wireless signals in one separate directional device beam, are activated. For each active device beam, beam reference signals (BRS), transmitted in one or more separate directional network beams, are received from the network; One or more network beams are included in an active set for the device beam; The network beam in the active set having the strongest received BRS is selected; An indication of the selected beam and received BRS strength measurements for the network beams in the active set are transmitted to the network; and signaling or data are transmitted to, or received from, the network, using the selected network/device beam pair.

Another embodiment relates to wireless device operative in a wireless communication network. The device includes a transceiver, memory, and a controller operatively connected to the memory and transceiver. The controller is operative to activate one or more antenna panels, each operative to receive wireless signals in one separate directional device beam. For each device beam, the controller is further operative to receive from the beam reference signals (BRS) transmitted in one or more separate directional network beams; include one or more network beams in an active set for the device beam; select the network beam in the active set having the strongest received BRS; transmit to the network an indication of the selected beam and received BRS strength measurements for the network beams in the active set; and transmit to, or receive from, the network, signaling or data using the selected network/device beam pair.

A method performed by the wireless device operative in a wireless communication network 1 is disclosed herein. The wireless device performs the following:

activating separate directional device beams of the wireless device;

receiving, for each activated separate directional device beam, beam reference signals, BRS, transmitted in separate directional network beams from a network node;

including one or more first network beams out of the separate directional network beams in an active set for a first device beam out of the activated separate directional device beams;

selecting a first network beam in the active set having a strongest signal strength or quality of a received BRS;

including one or more second network beams out of the separate directional network beams in a monitored set for a second device beam out of the activated separate directional device beams, which one or more second network beams are received with a signal strength or quality above a threshold, but which are not used for the transmission or reception of data; and transmitting to the network node a first indication of the selected first network beam and received BRS strength measurements for the one or more first network beams in the active set and a second indication of the candidate set indicating the one or more second network beams and one or more received BRS measurements for the one or more second network beams.

Some embodiments further comprise transmitting to, or receiving from, the network node 12, signaling or data using the selected first network beam and the first device beam and monitoring received BRS strength measurements of the one or more second network beams in the candidate set.

In some embodiments the received BRS strength measurements comprise a beam reference symbol received power, BRSRP, metric.

Some embodiments further comprise, after transmitting the indication of the selected first network beam to the network, receiving from the network node a command to use the indicated selected first network beam and the first device beam.

Some embodiments further comprise receiving the second command from the network node ordering the wireless device to use a second network node of the candidate set and the first device beam or the second device beam.

Some embodiments further comprise switching to use the second device beam and the first network beam when the first network beam is one of the one or more second network beams.

The embodiments herein may, of course, be carried out in other ways than those specifically set forth herein without departing from essential characteristics of the embodiments. The present embodiments are to be considered in all respects as illustrative and not restrictive, and all changes coming within the meaning and equivalency range of the appended claims are intended to be embraced therein.

The invention claimed is:

1. A method, performed by a wireless device, for managing beam-formed communication in a wireless communication network, wherein the wireless device is configured to handle separate directional device beams at the wireless device, the method comprising:

forming an active set for a first device beam out of the separate directional device beams of the wireless device by selecting one or more first network beams out of a plurality of separate directional network beams of the wireless communication network, the one or more first network beams selected based on received signal strength or quality, wherein the active set is to be used for transmission or reception of data;

selecting a first network beam in the active set as a preferred network beam for transmission or reception of data;

forming a monitored set for a second device beam out of the one or more separate directional device beams of the wireless device by selecting one or more second network beams out of the plurality of separate directional network beams of the wireless communication network, the one or more second network beams selected based on received signal strength or quality, but which are not to be currently used for the transmission or reception of data; and transmitting, to a network node:
a first indication of the preferred network beam and the received signal strengths or qualities for the one or more first network beams in the formed active set for the first device beam of the wireless device; and
a second indication indicating the one or more second network beams of the formed monitored set and the received signal strengths or qualities for the one or more second network beams in the formed monitored set for the second device beam of the wireless device.

2. The method of claim 1, further comprising, after transmitting the first indication of the preferred network beam, receiving from the network node a command to use the indicated preferred network beam and the first device beam for transmission or reception of data.

3. The method of claim 1, further comprising:
transmitting to the network node, or receiving from the network node, signaling or data using the preferred network beam and the first device beam;
monitoring received signal strength or quality measurements of the one or more second network beams and the second device beam in the monitored set; and
transmitting the monitored received signal strength or quality measurements to the network node.

4. The method of claim 3, further comprising receiving a second command, from the network node, ordering the wireless device to use a second network beam of the monitored set and the second device beam of the monitored set for transmission or reception of data.

5. The method of claim 4, further comprising switching to use the second network beam and the second device beam of the monitored set for signaling or data transmission.

6. The method of claim 1, further comprising switching to use the second device beam in the monitored set for transmission or reception of data when the first network beam is a second network beam out of the one or more second network beams and when received signal strength or quality of the first network beam and the second device beam in the monitored set is higher than the received signal strength or quality of the first network beam and the first device beam in the active set.

7. A method, performed by a network node, for managing beam-formed communication with a wireless device in a wireless communication network, the method comprising:
transmitting, to the wireless device, a respective reference signal in separate directional network beams; and
receiving, from the wireless device:
a first indication of a preferred network beam out of a plurality of separate directional network beams of the wireless communication network including the separate directional network beams of the network node, and signal strengths or qualities for one or more first network beams in a formed active set for a first device beam of the wireless device; and
a second indication indicating one or more second network beams of a formed monitored set for a second device beam of the wireless device and the signal strengths or qualities for the one or more second network beams in the formed monitored set for the second device beam of the wireless device.

8. The method of claim 7, further comprising, after receiving the first indication of the preferred network beam in the active set:
determining to use the preferred network beam in the active set and the first device beam of the wireless device; and
transmitting to the wireless device, a first command to use the preferred network beam and the first device beam of the active set for transmission or reception of data.

9. The method of claim 7, further comprising:
transmitting to the wireless device, or receiving from the wireless device, signaling or data using the preferred network beam and the first device beam of the wireless device; and
receiving, from the wireless device, updated signal strength or quality measurements of the monitored set of the wireless device.

10. The method of claim 9, further comprising:
determining to use, for transmission or reception of data, a second network beam of the monitored set and the second device beam of the monitored set based on the updated received signal strength or quality measurements; and
transmitting a second command, to the wireless device, ordering the wireless device to use the second network beam of the monitored set and the second device beam of the monitored set for transmission or reception of data.

11. The method of claim 10, further comprising switching to use the second network beam and the second device beam of the monitored set for signaling or data transmission.

12. A wireless device for managing beam-formed communication in a wireless communication network, wherein the wireless device is configured to handle separate directional device beams at the wireless device, the wireless device comprising:
processing circuitry;
memory containing instructions executable by the processing circuitry whereby the wireless device is operative to:
form an active set for a first device beam out of the separate directional device beams of the wireless device by selecting one or more first network beams out of a plurality of separate directional network beams of the wireless communication network, the one or more first network beams selected based on received signal strength or quality, wherein the active set is to be used for transmission or reception of data;
select a first network beam in the active set as a preferred network beam for transmission or reception of data;
form a monitored set for a second device beam out of the one or more separate directional device beams of the wireless device by selecting one or more second network beams out of the plurality of separate directional network beams of the wireless communication network, the one or more second network beams selected based on received signal strength or quality, but which are not to be currently used for the transmission or reception of data; and transmit, to a network node:
- a first indication of the preferred network beam and the received signal strengths or qualities for the one or more first network beams in the formed active set for the first device beam of the wireless device; and
- a second indication indicating the one or more second network beams of the formed monitored set and the received signal strengths or qualities for the one or more second network beams in the formed monitored set for the second device beam of the wireless device.

13. The wireless device of claim 12, wherein the instructions are such that the wireless device is operative to, after transmitting the first indication of the preferred network beam, receive, from the network node, a command to use the indicated preferred network beam and the first device beam for transmission or reception of data.

14. The wireless device of claim 12, wherein the instructions are such that the wireless device is operative to:
- transmit to the network node, or receive from the network node, signaling or data using the preferred network beam and the first device beam;
- monitor received signal strength or quality measurements of the one or more second network beams and the second device beam in the monitored set; and
- transmit the monitored received signal strength or quality measurements to the network node.

15. The wireless device of claim 14, wherein the instructions are such that the wireless device is operative to receive a second command, from the network node, ordering the wireless device to use a second network beam of the monitored set and the second device beam of the monitored set for transmission or reception of data.

16. The wireless device of claim 15, wherein the instructions are such that the wireless device is operative to switch to use the second network beam and the second device beam of the monitored set for signaling or data transmission.

17. The wireless device of claim 12, wherein the instructions are such that the wireless device is operative to switch to use, for transmission or reception of data, the second device beam in the monitored set when the first network beam is a second network beam out of the one or more second network beams and when received signal strength or quality of the first network beam and the second device beam in the monitored set is higher than the received signal strength or quality of the first network beam and the first device beam in the active set.

18. A network node for managing beam-formed communication with a wireless device in a wireless communication network, the network node comprising:
processing circuitry;
memory containing instructions executable by the processing circuitry whereby the device is operative to:
- transmit, to the wireless device, a respective reference signal in separate directional network beams; and
- receive, from the wireless device:
  - a first indication of a preferred network beam out of a plurality of separate directional network beams of the wireless communication network including the separate directional network beams of the network node, and signal strengths or qualities for one or more first network beams in a formed active set for a first device beam of the wireless device; and
  - a second indication indicating one or more second network beams of a formed monitored set for a second device beam of the wireless device and the signal strengths or qualities for the one or more second network beams in the formed monitored set for the second device beam of the wireless device.

19. The network node of claim 18, wherein the instructions are such that the network node is operative to, after receiving the first indication of the preferred network beam in the active set:
- determine to use the preferred network beam in the active set and the first device beam of the wireless device; and
- transmit, to the wireless device, a first command to use the preferred network beam and the first device beam of the active set for transmission or reception of data.

20. The network node of claim 18, wherein the instructions are such that the network node is operative to:
- transmit to the wireless device, or receive from the wireless device, signaling or data using the preferred network beam and the first device beam of the wireless device; and
- receive, from the wireless device, updated signal strength or quality measurements of the monitored set of the wireless device.

21. The network node of claim 20, wherein the instructions are such that the network node is operative to:
- determine to use, for transmission or reception of data, a second network beam of the monitored set and the second device beam of the monitored set based on the updated received signal strength or quality measurements; and
- transmit a second command to the wireless device ordering the wireless device to use the second network beam of the monitored set and the second device beam of the monitored set for transmission or reception of data.

22. The network node of claim 21, wherein the instructions are such that the network node is operative to switch to use the second network beam and the second device beam of the monitored set for signaling or data transmission.

* * * * *